Patented Jan. 7, 1930

1,742,750

UNITED STATES PATENT OFFICE

LINN BRADLEY, OF MONTCLAIR, NEW JERSEY

PRODUCTION AND UTILIZATION OF CARBON MONOXIDE

No Drawing.   Application filed April 7, 1926. Serial No. 100,221.

This invention relates to the treatment of iron ores, particularly for the reduction of iron oxide to iron by means of carbon monoxide, and to means and methods for producing the carbon monoxide, and for carrying out the reduction treatment.

Among the objects of the invention are the control of the temperature in the hotter portions of the furnace or furnaces; effective utilization of reducing agent so as to operate with only a moderate excess of reducing agent over that theoretically required; to obtain gases of high calorific value which may be utilized in internal combustion engines or even in the production of steel from the iron obtained by this process; to provide a method suitable for the treatment of iron ores which are not now considered especially desirable for blast furnace practice. Other objects and advantages will be understood by the following more detailed description of the invention.

According to this invention, iron oxide is reduced to iron either wholly or primarily by carbon monoxide gas; the carbon monoxide is obtained by bringing a mixture of carbon dioxide and oxygen, with or without nitrogen, in limited and regulated amounts and proportions, into intimate contact with hot carbon, with resulting production of carbon monoxide, part of which results from the oxygen combining with carbon and another part of which results from the interaction between carbon dioxide and hot carbon, the necessary heat units for the latter reaction (which is endothermic) being supplied by the heat generated by the other reaction (which is exothermic), and the amount of these reagents, respectively, is so chosen that the carbon is maintained at the required temperature and yet prevented from reaching an excessive temperature, which might otherwise be reached if oxygen mixed with a small amount of nitrogen and free from carbon dioxide were brought into intimate contact with hot carbon. The excess of exothermic heat energy over the endothermic heat energy is controlled and regulated so that the required amount of carbon monoxide is formed, and so that the temperature is within the required range.

The following assumed equations will serve to illustrate some of the important features of the invention:

(1) $CO_2 + C = 2CO - 38,880$ cal.
(2) $C + O = CO + 29,160$ cal.
(3) $CO_2 + 2C + O = 3CO - 9,720$ cal.
(4) $CO_2 + 2O + 3C = 4CO + 19,440$ cal.
(5) $CO_2 + 3O + 4C = 5CO + 48,600$ cal.
(6) $CO_2 + 4O + 5C = 6CO + 77,760$ cal.
(7)          $4O + 4C = 4CO + 116,640$ cal.

Comparison between (6) and (7) shows a difference of 38,880 cal. heat energy available for raising the products to a higher temperature. In (6) 50% more CO is present, due to gasifying only 25% more carbon, i. e. 5C as against 4C converted into CO. This larger amount of CO absorbs some heat energy as sensible heat and thus further modifies the temperature. In this way useful CO is produced from $CO_2$, and the temperature is lower than when it is excluded. In computing the theoretical temperatures, all of the thermophysical factors should be considered, such as sensible heats, latent heats if involved, radiation and conduction losses, specific heats of various materials present, etc.

Such use of $CO_2$ gas, mixed with oxygen in the proper ratio, permits the use of oxygen gas which may be readily obtained from air by any suitable means. While nitrogen is not required in the mixed gases, a moderate amount may be present with some advantage. The oxygen gas may thus be produced to contain, for example, around 10% nitrogen and 90% oxygen, or even larger amounts of nitrogen may be present, but it should be materially less than that present in air, in order to permit using more $CO_2$ than if air, not enriched, were used. The nitrogen increases the gas volumes and by its capacity for absorbing heat energy as sensible heat is objectionable when present in large amounts. The use of the endothermic reaction of $CO_2$ and hot C not only has a greater effect on temperature than a similar volume of nitrogen, but it produces some CO which is available for use in another portion of the furnace.

The following assumed equations serve to show the difference between the use of $CO_2$, illustrated above, and the use of $H_2O$. Consideration of these equations and the further discussion below, shows that the use of mixtures of $CO_2$ and oxygen, either free from or accompanied by a moderate and controlled amount of nitrogen, in the process of this invention has special advantage.

(1A) $H_2O + C = CO + 2H - 28,900$ cal.
(2A) $2H + O = H_2O + 58,060$ cal.
(3A) $H_2O + O + 2C = 2CO + 2H + 260$ cal.
(4A) $H_2O + 2O + 3C = 3CO + 2H + 29,420$ cal.
(5A) $H_2O + 3O + 4C = 4CO + 2H + 58,580$ cal.
(6A) $H_2O + 4O + 5C = 5CO + 2H + 87,740$ cal.
(7A) $4O + 4C = 4CO + 116,640$ cal.

Comparison between $CO + O = CO_2 + 68,040$ cal. and Equation (2A) shows 9,980 cal. more heat generated for the same amount of oxygen added when the CO is used, as against hydrogen. Comparison between (6A) and (7A) shows a difference of 28,900 cal. and a difference of only 1CO for a difference of 1C. The cooling effect when using water vapor appears to be less than when $CO_2$ is used as the diluent of the oxygen, the comparison being made when using equal amounts of carbon and oxygen in the steps. In one case a mixture of CO and hydrogen results, while in the other case CO is formed. The heat absorbing capacity of CO is greater than that of hydrogen and thus a better cooling effect is thereby obtained.

The reduction of iron oxide by CO alone differs from that by mixtures of CO and hydrogen. The reduction of $Fe_2O_3$ by CO gas is an exothermic reaction; that by hydrogen is endothermic.

$Fe_2O_3 + 3CO = 2Fe + 3CO_2 + 8,520$ cal.
$Fe_2O_3 + 6H = 2Fe + 3H_2O - 21,420$ cal.

The above assumed equations serve to show that $CO_2$, when mixed with oxygen gas, has a better cooling effect in the hot portion of the furnace, e. g. in the tuyère zone, and that in the reduction of iron oxide to iron, heat is generated which is available for increasing the temperature, both of which are very desirable when using oxygen gas in a blast furnace, the nitrogen being less in amount than if ordinary unenriched air be used. Owing to the greater cooling effect of $CO_2$, as compared with water vapor, less diluent, relatively, may be used and still control the temperatures to the desired degree. The gases formed by the reactions between $CO_2$, oxygen and hot coke, and which consist largely of CO, raised to the temperature of the region, in passing upward through the stock (mixture of coke, iron ore, flux) give up some of their sensible heat to the descending charge and are thereby somewhat cooled. The reduction of $Fe_2O_3$ to Fe by carbon monoxide generates heat which serves to maintain the temperature at the required point. When hydrogen is used, along with CO, the reduction step differs somewhat, any reduction by hydrogen tending to reduce the temperature and carbon monoxide tending to increase the temperature. By regulating the composition of the gas, so that its content of CO and its content of hydrogen are controlled, the temperature of the stock at various portions of the furnace may be controlled to a considerable degree. CO alone tends to distribute the temperature more uniformly throughout the furnace than does hydrogen, or even a mixture of CO and hydrogen.

It is desirable to have the exit gases from the furnace of high calorific value, preferably low in nitrogen, water vapor and other impurities of a deleterious nature; and to have these gases leave the furnace at a relatively low temperature, thus retaining in the furnace substantially all of the heat introduced into or generated therein. By preheating the carbon dioxide gas, either before or after mixing with the oxygen, a considerable amount of heat may be introduced into the furnace. The volume of gases leaving the furnace being much smaller than when ordinary air is used in the furnace, a larger portion of the heat may be retained in the charge, partly due to the lower rate of travel and thus a longer time for giving up their heat energy down to a point approximating the temperature of the materials constituting the burden. Even if the gases leave at the same temperature, they contain less heat energy owing to their amount being much less than otherwise.

The mixture of $CO_2$ and oxygen may be obtained in any suitable manner, and their mixture may be varied to suit the conditions. When a lower temperature is desired in the tuyère region, more $CO_2$ may be used, holding the oxygen constant, or the $CO_2$ gases either before or after mixing the oxygen may be heated to a lower temperature thus introducing less heat energy as sensible heat. To increase the temperature, the $CO_2$ may be decreased in proportion to the oxygen, or the gases may be passed into the furnace at a higher rate or/and at a higher preheated temperature. It will be understood that the reaction of C and O is exothermic, while the reaction of $CO_2$ and C is endothermic, and that heat as sensible heat in the gases used may supply a portion of the heat energy required in the tuyère region. A moderate amount of nitrogen in the mixture of $CO_2$ and oxygen also influences the operations. When it is preheated it serves to introduce some heat energy into the furnace, and in the furnace it aids in controlling the temperatures and acts as a carrier of heat energy from the lower portion of the furnace to be distributed throughout the charge down to its exit temperature. Therefore, by controlling the amounts of each of these gases, their temperature when introduced, the rate of introducing them into the furnace, and their ratio to each other, the operations within the furnace may be varied considerably and in an advantageous manner. Any suitable manner of mixing and proportioning the gases may be used, likewise the preheating.

A mixture of CO and $CO_2$ gases can reduce iron oxide, and the extent and rate depends upon temperature, ratio of CO to $CO_2$, the character of the ore, and the extent of the reduction. With gases at around 600 deg. C., a rather high proportion of $CO_2$ may be present, perhaps around 40% or more, and yet iron oxide can be reduced to a considerable degree. The longer the gases remain in contact under such conditions, the more feasible it is to reduce some iron oxide and form more $CO_2$. By excluding large amounts of nitrogen, the volume of gas passing in unit time is somewhat reduced, thus promoting the reduction step in the cooler portions of the furnace, e. g. above the tuyère zone.

The preheating of the charge (ore, stone and coke) may be effected in the furnace by the passing gases, to the extent that such gases carry the desired available heat energy. In case the amount of such available heat is low, the charge can be given a preheating treatment, in part, prior to charging it into the furnace. The gases from the furnace may be utilized for this purpose, and may even be burned so as to generate some additional heat by conversion of CO into $CO_2$, and the hot gases passed into intimate contact with the constituents of the charge which are to be preheated, countercurrent wise if desired. Only such an amount of gases need be burned as may be required for the preheating, the other portion being kept separate. The amount of heat absorbed by the charge will depend upon various factors, for example the amount of the charge per ton of iron, its specific heat, etc. This process permits varying the amount of heat available for preheating the charge to the required point.

The carbon dioxide used for mixing with oxygen and acting as a diluent and for the production of some CO in the lower portion of the furnace, due to the hot carbon contained therein, may be obtained in any suitable manner. The following method has several advantages and is especially available when the amount of nitrogen therein is very small. Some of the mixture of CO and $CO_2$ from the upper portion of the furnace is burned to $CO_2$ by oxygen to yield a gas high in $CO_2$ and low in nitrogen. Some of the oxygen gas, with little or no nitrogen present, is used for this purpose and is advantageously diluted with some $CO_2$ gas, e. g. obtained by this same type of burning. The mixture is such that when the CO and $CO_2$ gas is mixed therewith and ignited, substantially $CO_2$ gas results, and in this way the $CO_2$ gas is readily obtained. By using enough $CO_2$ as diluent, the final temperature of the combustion is kept under control so that the equipment readily withstands the temperature. An internal combustion engine may be thus used and power generated and the resulting $CO_2$ used for the indicated steps of the process. Alternatively, the hot products of combustion, carrying the desired ratio of oxygen to $CO_2$, may be the gas mixture which is charged into the furnace through the tuyères. By suitably insulating the gas combustion chamber and passages, most of the heat thus generated is available as sensible heat in the "blast." In this manner, the use of the hot-blast stoves of the recuperative type are not required. Care should be taken to avoid building the nitrogen content up to an objectionable or undesired point. This can be done quite readily by controlling the amount of nitrogen in the gases entering the furnace, leaving the furnace and in the oxygen gas used for oxidizing the CO.

By making due allowance for sensible heats, specific heats, etc., the following assumed equations will serve to illustrate how the mixtures of oxygen and $CO_2$ may be varied, and the amount of carbon and iron oxide adjusted for the operations. The amount of heat energy appearing as a surplus, from these equations, is useful in raising the temperature of the products to the desired point which may be controlled as pointed out.

(10) $2CO_2 + 3O + Fe_2O_3 + 5C = 4CO + 3CO_2 + Fe_2 + 18{,}240$ cal.
(11) $2CO_2 + 4O + Fe_2O_3 + 6C = 5CO + 3CO_2 + Fe_2 + 47{,}400$ cal.
(10A) $2CO_2 + 3O + 5C = 7CO + 9{,}720$ cal.
(11A) $2CO_2 + 4O + 6C = 8CO + 38{,}880$ cal.

Assumed Equations 10 and 11 show the amount of heat generated, considering the entering and exit gases to be as represented. Assumed Equations 10A and 11A show the heat generated in the lower region of the furnace, assuming the reaction to proceed entirely to CO in that region, and that no other reactions occur. As a matter of fact, all of the $CO_2$ will not be changed over into CO immediately upon entering the furnace, and as a result, more heat will be generated in the tuyère region than the two latter equations indicate. Consequently, the temperatures in the lower portion will be higher than such quantity of heat units would indicate. The $CO_2$ becomes highly heated and is thereafter converted, to some extent, into CO, and the CO in the gases acts upon iron oxide to reduce it to Fe. A considerable amount of the reduction occurs above the tuyère region, so that in the lower portion the melting may be done.

The furnace may be started in any suitable manner, and the mixture of $CO_2$ and oxygen gradually brought into use, for example by using more $CO_2$, or more $CO_2$ and nitrogen in proportion to oxygen than is to be used in regular practice, after which the amount of oxygen, relatively, may be increased to such a point as gives the desired results, and thereafter the mixture of gases may be so regulated and controlled as to have the desired composition, temperature, pressure and amount.

One of the products of this process is a gas which has a high calorific value, e. g. principally CO and $CO_2$. In order to avoid water vapor in the gases, the burden is added in the dry state, and if necessary is subjected to a drying operation and preheating treatment before being charged into the furnace. This high-calorific gas is very useful in the production of power by use in internal combustion engines, and it may be used to furnish the heat in e. g. an open-hearth furnace in which the iron produced by the process is converted into steel. It may be burned under boilers to produce steam; and it may be burned in cement kilns in which some of the slag is treated after properly proportioning the ingredients to make a suitable raw mix. Some of the furnace exit gases are advantageously used in the production of a preheated mixture of oxygen and $CO_2$ for use as the hot-blast. By burning some of the exit gases with a mixture of oxygen and $CO_2$ gas and using the heat generated, in an open-hearth furnace, the hot products of combustion, consisting primarily of $CO_2$, may be used for mixing with more oxygen, some of which is used for the hot-blast. In this way the full value of the gases thus used is almost attained. Thus, the highly calorific gas from the blast furnace is used in the open-hearth, the hot products of combustion from the open-hearth are used, at least in part, for preparing a hot-blast for the furnace, oxygen being used therein when the hot-blast is introduced into the furnace. It is not necessary, however, that all of the iron be thus treated in an open-hearth heated in such manner, or that all of the exit gases from the blast furnace be used in an open-hearth. The amount of coke charged into the blast furnace should be so chosen that the furnace is suitably burdened for furnace operations, and so that the necessary or desired heat conditions therein are realized. Reduction of the coke to suit these conditions and yet economize in the amount used can be effected by ordinary adjustments of those skilled in the art. Where it is desired to produce more gas than actually required, more coke may be charged, and the gases adjusted accordingly and in this manner the blast furnace may even be run primarily for the production of a large amount of gas of high calorific value, and the iron produced and the slag as well might even be considered as by-products of the operations.

Where CO and $CO_2$ gases are mixed with $CO_2$ and oxygen and the mixture ignited, the $CO_2$ functions principally as a diluent and the exothermic reactions are the ones of principal concern. The endothermic reaction of $CO_2$ and hot C are not then present, consequently more $CO_2$ should be present than where hot carbon is present, as the temperature limiting factor depends more upon the sensible heat absorbing capacity of the gases.

In another embodiment of the invention, the CO is formed in a separate furnace from that in which the oxide of iron is reduced by such CO. For example, a hot mixture of $CO_2$ and oxygen is passed through hot carbon in a suitable furnace, for instance similar to a water gas generator in which steam is passed through a bed of highly heated carbon to form CO and hydrogen. But in the process of the present invention, a mixture of $CO_2$ and oxygen, preferably preheated to a rather high temperature, e. g. around 500 to 900 deg. C., is passed through a bed of hot carbon, the exothermic reaction of oxygen and carbon to form CO being greater in amount than the endothermic reaction of $CO_2$ and C to form CO, in this manner maintaining the carbon at the required temperature for continuous operation. The exit gases, principally CO (but which may contain a moderate amount of nitrogen as pointed out above), are then passed into intimate contact with iron ore under suitable conditions to reduce the iron oxide to iron without reaching the fusing point of iron, and so as to produce an exit gas which is fairly rich in $CO_2$. By passing dried iron ore, in fairly small pieces, through a multiple-hearth furnace such as the well-known Wedge furnace, and passing the hot CO gases countercurrent to the travel of the iron ore, the reduction may be effected readily, some of the sensible heat in the gases being used to preheat the iron ore to the necessary reaction temperature. In this way the exit gases are somewhat cooled, and thus the heat units are well utilized. A reaction temperature around 500 to 600 deg. C. at the start, and around 800 to 1,100 deg. C. at the end of the reduction step is capable of yielding good results. Where the amount of sensible heat available for preheating the ore is sufficient, no other application of heat is needed, but where it is insufficient, additional heating may be resorted to so that the preheated ore is of the required temperature for effecting the reduction to the required extent within the time available. The rate of reduction at the higher temperatures is greater than at the lower temperatures, especially toward the end of the reduction period. The rate of feeding the ore is therefore so controlled as well as the rate of passing the gas, that the reduction reaches the required point by the time the treated ore is ready to be discharged from the furnace. Where the finished material requires cooling in a reducing atmosphere before permitting air to come into contact with the reduced material, e. g. to avoid reoxidation of iron, some of the CO gases, low in $CO_2$, may be cooled, if needed, and these cooled gases used for cooling the reduced material. The reduced material may be subjected to a magnetic separation, after crushing and screening if necessary or desired, to separate iron from gangue, and this iron treated in an open-hearth furnace, for example, to be converted into steel. The reduced material may, without magnetic separation, be charged into a suitable furnace together with fluxing ingredients and the gangue slagged off and the iron melted and thereafter converted into steel. Some of the CO gases may be used for the subsequent treatment of the reduced furnace product obtained by reaction on iron oxide with hot CO gases.

I claim:

1. The process of obtaining metals from their oxides which comprises charging the oxide, and carbon into a blast furnace passing a mixture of oxygen and carbon dioxide into the lower portion of the furnace, the proportions of said gases in the mixture being controlled so as to generate or absorb heat by chemical reaction with the coke and thereby to maintain the required temperature in the furnace and simultaneously to produce as a product of said reaction carbon monoxide gas by which the metallic oxide is reduced.

2. The process of obtaining iron from iron ore, which comprises charging iron ore, coke and flux into a blast furnace, passing a mixture of oxygen and carbon dioxide into the lower portion of the furnace to generate sufficient heat therein to melt the iron and to form a fluid slag, removing a mixture of carbon monoxide and carbon dioxide from the upper portion of the furnace, and treating such a mixture of gases to form a gas mixture of carbon dioxide and oxygen and using the last mentioned mixture in the blast furnace, substantially as described.

3. The process for obtaining metals from oxide ores which comprises charging ore and carbon into a blast furnace, passing into the lower portion of said furnace a mixture comprising carbon dioxide, oxygen and water vapor, said gases being supplied in predetermined proportions adapted to control substantially independently of each other the heat developed in the melting zone and in the reducing zone.

4. The process of producing steel, which includes the steps of introducing a hot mixture comprising carbon dioxide and oxygen into the lower portion of a blast furnace charged with iron ore, carbon and flux, obtaining iron and slag from the lower portion of the furnace and a mixture comprising carbon monoxide and carbon dioxide from the upper portion of the furnace, charging the iron into an open-hearth furnace and heating the latter furnace with hot gases resulting from the combustion of some of the carbon monoxide obtained from the blast furnace, mixing a portion of the exit gases from the open-hearth furnace with oxygen and returning the gases to the lower portion of the blast furnace.

5. The process of obtaining a molten iron-bearing product, which includes the steps of introducing hot gases including oxygen into a furnace charged with iron ore, carbon and slag-forming ingredients, thereby producing molten iron and slag and also producing furnace gases comprising carbon monoxide and carbon dioxide; transferring some of the iron to a furnace of the reverberatory type; heating the latter furnace at least in part by means of heat resulting from oxidation of some of the carbon monoxide; utilizing some of the heat developed by oxidation of such carbon monoxide in the preparation of hot gases comprising oxygen; and introducing the prepared hot gases into a furnace charged with material comprising an oxide of iron, carbon-bearing material and slag-forming ingredients so as to obtain a molten product including iron.

6. A process of obtaining a molten iron-bearing product, which includes the steps of introducing hot gases including oxygen into a furnace of the blast furnace type charged with iron ore, carbonaceous matter and slag-forming ingredients, thereby producing molten iron and slag and also producing furnace gases comprising carbon monoxide and carbon dioxide; removing iron and slag from the furnace; introducing iron into an open-hearth furnace; heating the latter furnace at least in part by means of heat resulting from oxidation of some of the carbon monoxide; removing hot products of such oxidation from the open-hearth furnace; utilizing some of the heat contained in the exit gases from the open-hearth furnace in an operation which includes preparation of hot gases including oxygen and introduction of the prepared hot gases into a furnace of the blast furnace type charged with materials comprising an oxide of iron, carbonaceous material and slag-forming ingredients, whereby to obtain a molten product including iron.

7. The process of obtaining a molten iron-bearing product, which includes the steps of introducing hot gases including oxygen into a furnace charged with materials comprising an oxide of iron, carbon and slag-forming ingredients, thereby producing molten iron and slag and also producing furnace gases comprising carbon monoxide and carbon dioxide; introducing iron into a furnace of the reverberatory type; heating the latter furnace at least in part by means of heat resulting from oxidation of some of the carbon monoxide; introducing into oxygen-bearing gases some of the sensible heat content of hot gases from the latter furnace; and introducing these oxygen-bearing gases into a furnace charged with material comprising an oxide of iron, carbon and slag-forming ingredients, so as to obtain a molten product including iron.

8. The process of obtaining a molten iron-bearing product, which includes the steps of introducing gases including oxygen into a furnace of the blast furnace type charged with materials comprising an oxide of iron, carbon and slag-forming ingredients, thereby producing molten iron and slag and also producing furnace gases comprising carbon monoxide and carbon dioxide; introducing iron into an open-hearth furnace; heating the latter furnace at least in part by means of hot products of combustion resulting at least in part from oxidation of some of the carbon monoxide; removing hot products of combustion from the open-hearth furnace; utilizing some of the heat contained in hot gases from the open-hearth furnace in an operation which includes heating gases including oxygen and introducing such heated gases into a furnace of the blast furnace type charged with materials comprising an oxide of iron, carbon and slag-forming ingredients, whereby to obtain a molten product including iron.

In testimony whereof I affix my signature.

LINN BRADLEY.